(12) United States Patent
Doyle et al.

(10) Patent No.: US 11,080,422 B2
(45) Date of Patent: Aug. 3, 2021

(54) SYSTEMS AND METHODS FOR GENERATING AND PROCESSING SECURE SEARCH QUERIES

(71) Applicant: Palantir Technologies Inc., Palo Alto, CA (US)

(72) Inventors: John Doyle, Washington, DC (US); Jason Free, Arlington, VA (US); Jacob Magid, New York, NY (US); Michael Rochlin, New York, NY (US); Sean Hacker, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 173 days.

(21) Appl. No.: 16/375,721

(22) Filed: Apr. 4, 2019

(65) Prior Publication Data

US 2020/0293689 A1    Sep. 17, 2020

Related U.S. Application Data

(60) Provisional application No. 62/817,271, filed on Mar. 12, 2019.

(51) Int. Cl.
*G06F 21/62* (2013.01)
*G06F 16/903* (2019.01)
(Continued)

(52) U.S. Cl.
CPC ...... *G06F 21/6254* (2013.01); *G06F 16/9014* (2019.01); *G06F 16/90335* (2019.01); *G06F 21/602* (2013.01); *H04L 63/105* (2013.01)

(58) Field of Classification Search
CPC ... G06F 21/6281; G06F 21/604; G06F 9/4856
(Continued)

(56) References Cited

U.S. PATENT DOCUMENTS 8,296,312 B1 * 10/2012 Leung .................. G06F 16/152
 707/760
8,655,878 B1 *  2/2014 Kulkarni ................ G06F 16/43
 707/736

(Continued)

OTHER PUBLICATIONS

Extended European Search Report for EP Appln. No. 20162629.8 dated Jun. 29, 2020, 10 pages.

*Primary Examiner* — Mohammad W Reza
(74) *Attorney, Agent, or Firm* — Sheppard Mullin

(57) ABSTRACT

Generating a first signature value corresponding to a first dataset stored in a first data region having a first access permission level. Determining a signature anonymization value. Truncating the first signature value based on the signature anonymization value. Generating a secure search query for identifying, based on the truncated first signature value, second signature values corresponding to entries of a second dataset stored in one or more second data regions having one or more second access permission levels. Receiving a response to the secure search query including the plurality of second signature values. Determining the entries of the second dataset from the second signature values. Comparing the respective entries of the second dataset to the at least a portion of the first dataset. Generating one or more notifications based on the comparisons indicating a potential match between a particular respective entry of the second dataset and the at least a portion of a first dataset.

20 Claims, 7 Drawing Sheets

(51) Int. Cl.
*G06F 16/901* (2019.01)
*G06F 21/60* (2013.01)
*H04L 29/06* (2006.01)

(58) Field of Classification Search
USPC .......................................................... 726/26
See application file for complete search history.

(56) References Cited

U.S. PATENT DOCUMENTS

| | | |
|---|---|---|
| 10,735,205 B1 * | 8/2020 | Wentz .................. H04L 9/3257 |
| 2009/0249082 A1 | 10/2009 | Mattsson |
| 2018/0012034 A1 | 1/2018 | Rozenberg et al. |
| 2018/0115625 A1 | 4/2018 | Livneh |

* cited by examiner

SYSTEMS AND METHODS FOR GENERATING AND PROCESSING SECURE SEARCH QUERIES

TECHNICAL FIELD

This disclosure pertains to systems for generating and processing search queries. More specifically, this disclosure pertains to systems for generating and processing secure search queries.

BACKGROUND

Under traditional approaches, databases may be searched using search queries. For example, a system may submit a search query to a database for entries including a search term (e.g., "John Doe"). In order for the database to perform the search, the search term (e.g., "John Doe") typically must be exposed to the database, and potentially other systems, as well. This creates an inherent security risk because the search term itself may be considered sensitive information that should not be exposed to the database, and/or any other systems.

SUMMARY

A claimed solution rooted in computer technology overcomes problems specifically arising in the realm of computer technology. In various implementations, a computing system is configured to generate a first signature value (e.g., a cryptographic hash value) corresponding to at least a portion of a first dataset (e.g., raw enclave dataset). For example, the first signature value may correspond to data that may be used as a search term (e.g., "John Doe"). The first dataset may be stored in a first data region having a first access permission level. For example, the first data region may be a network enclave that stores sensitive information that should not be exposed to any external data regions. The computing system may determine a signature anonymization value, and then truncate the first signature value based on the signature anonymization value. For example, the first signature value may be a 128-character signature value that is truncated to the first 4 characters of the first signature value. A secure search query may be generated for identifying, based on the truncated first signature value, a plurality of second signature values. Each of the plurality of second signature values may include a full cryptographic hash corresponding to a respective entry of a second dataset (e.g., central dataset) stored in one or more second data regions (e.g., a public data region of a central system) having one or more second access permission levels. Accordingly, the computing system may provide a secure search query for a search term (e.g., "John Doe") without exposing the search term itself, or even the complete signature corresponding to the search term.

In some embodiments, the computing system may receive a response to the secure search query, and the response may include the plurality of second signature values. The computing system may then determine the respective entries of the second dataset from the plurality of the second signature values (e.g., based on the same cryptographic hash function used to generate the first and second signatures). The entries of the second dataset may be compared to the at least a portion of the first dataset to determine whether any matches exist. One or more notifications may be generated based on the comparisons. Each of the one or more notifications may indicate a potential match between a particular respective entry of the second dataset and the at least a portion of a first dataset.

In some embodiments, the response to the secure search query also includes a source of the second signature. For example, the secure search query may be provided to several different "public" data regions, and the response will indicate the source data regions.

Various embodiments of the present disclosure include systems, methods, and non-transitory computer readable media configured to generate a first signature value corresponding to at least a portion of a first dataset, the first dataset being stored in a first data region having a first access permission level. A signature anonymization value is determined. The first signature value is truncated based on the signature anonymization value. A secure search query is generated for identifying, based on the truncated first signature value, a plurality of second signature values, each of the plurality of second signature values corresponding to a respective entry of a second dataset, the second dataset being stored in one or more second data regions having one or more second access permission levels, the one or more second data regions being distinct from the first data region. A response to the secure search query is received, the response to the secure search query including the plurality of second signature values. The respective entries of the second dataset are determined from the plurality of the second signature values. Each of the respective entries of the second dataset are compared to the at least a portion of the first dataset. One or more notifications are generated based on the comparisons, each of the one or more notifications indicating a potential match between a particular respective entry of the second dataset and the at least a portion of a first dataset.

In some embodiments, each of the first signature value and the plurality of second signature values comprise hash values.

In some embodiments, the first data region comprises an enclave data region, and the one or more second data regions comprise a public data region.

In some embodiments, the response to the secure search query includes data source metadata indicating, for at least one of the plurality of second signatures, a particular second data region of the one or more second data regions storing the respective entry of the second dataset.

In some embodiments, a network enclave system comprises the first data region, and the first access permission level does not permit the first dataset to leave the first data region. In some embodiments, a central system comprises the one or more second data regions, and the second permission level permits at least a portion of the second dataset to the leave the one or more second data regions.

In some embodiments, the signature anonymization value ensures at least a predetermined numbers of matches if the second dataset includes at least a threshold number of entries. In some embodiments, the signature anonymization value is based on a number of entries of the second dataset. In some embodiments, the threshold number of entries is based on the number of entries of the second dataset.

In some embodiments, the signature anonymization value indicates a number of characters from the first signature value to include in the truncated first signature value.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

A claimed solution rooted in computer technology overcomes problems specifically arising in the realm of computer technology. In various implementations, a computing system is configured to generate a first signature value (e.g., a cryptographic hash value) corresponding to at least a portion of a first dataset (e.g., raw enclave dataset). For example, the first signature value may correspond to data that may be used as a search term (e.g., "John Doe"). The first dataset may be stored in a first data region having a first access permission level. For example, the first data region may be a network enclave that stores sensitive information that should not be exposed to any external data regions. The computing system may determine a signature anonymization value, and then truncate the first signature value based on the signature anonymization value. For example, the first signature value may be a 128-character signature value that is truncated to the first 4 characters of the first signature value. A secure search query may be generated for identifying, based on the truncated first signature value, a plurality of second signature values. Each of the plurality of second signature values may include a full cryptographic hash corresponding to a respective entry of a second dataset (e.g., central dataset) stored in one or more second data regions (e.g., a public data region of a central system) having one or more second access permission levels. Accordingly, the computing system may provide a secure search query for a search term (e.g., "John Doe") without exposing the search term itself, or even the complete signature corresponding to the search term.

In some embodiments, the computing system may receive a response to the secure search query, and the response may include the plurality of second signature values. The computing system may then determine the respective entries of the second dataset from the plurality of the second signature values (e.g., based on the same cryptographic hash function used to generate the first and second signatures). The entries of the second dataset may be compared to the at least a portion of the first dataset to determine whether any matches exist. One or more notifications may be generated based on the comparisons. Each of the one or more notifications may indicate a potential match between a particular respective entry of the second dataset and the at least a portion of a first dataset.

In some embodiments, the response to the secure search query also includes a source of the second signatures. For example, the secure search query may be provided to several different "public" data regions, and the response will indicate the source data regions.

Figure 1:
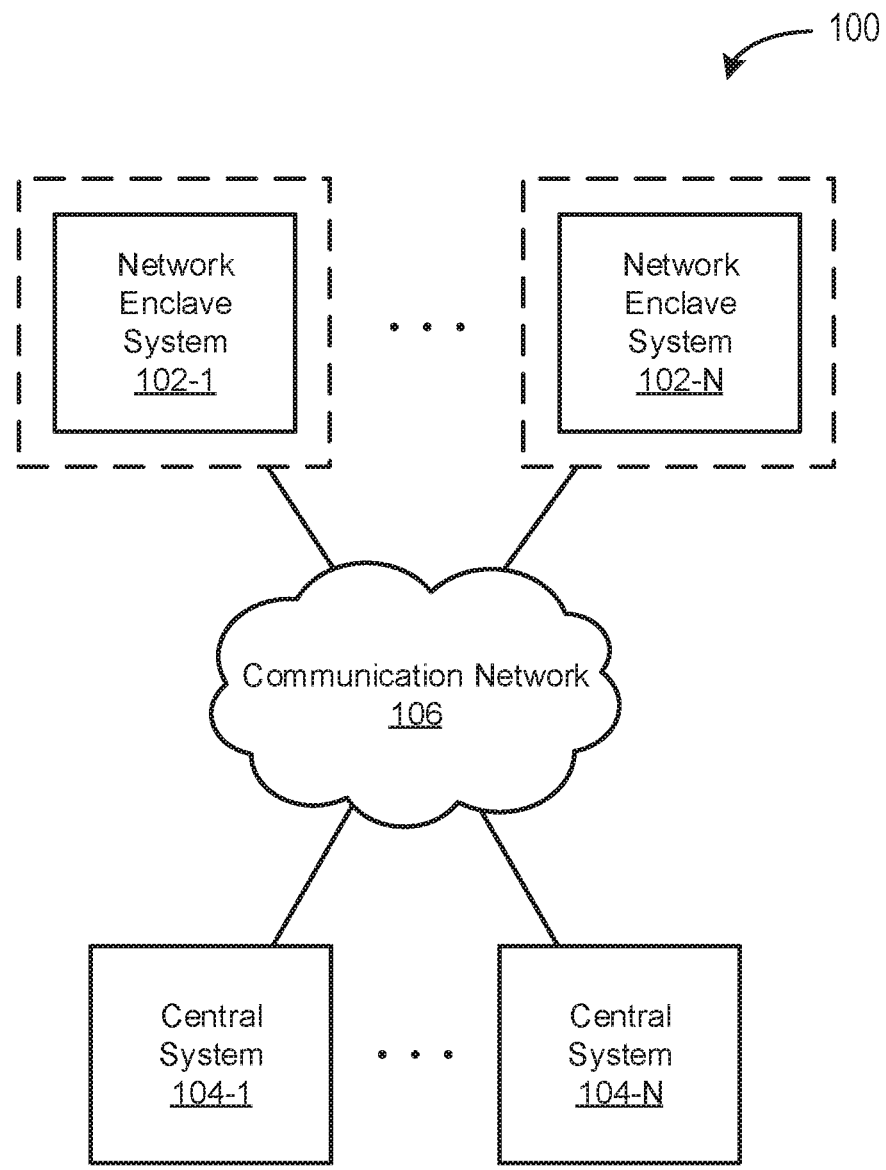
FIG. 1 depicts a diagram of an example system for generating and processing secure search queries according to some embodiments.

FIG. 1 depicts a diagram 100 of an example system for generating and processing secure search queries according to some embodiments. In the example of FIG. 1, the system includes network enclave systems 102-1 to 102-N (individually, the network enclave system 102, collectively, the network enclave systems 102), central systems 104-1 to 104-N (individually, the central system 104, collectively, the central systems 104), and a communication network 106.

The network enclave systems 102 may function to store raw enclave data. Raw enclave data may include sensitive information that should not leave the network enclave systems 102. For example, raw enclave data may include patient records, and/or the like. In various embodiments, functionality of the network enclave systems 102 may be performed by one or more servers (e.g., a cloud-based server) and/or other computing devices. The network enclave systems 102 may comprise small-scale instances used to host relatively small amounts of sensitive information. For example, the network enclave systems 102 may not be able to host enterprise-level information, and/or may have limited hosting capabilities.

In some embodiments, a network enclave system 102 may function to confine its raw enclave data to that network enclave system 102 (e.g., via firewalls, access permission controls, and/or the like). For example, the network enclave system 102 may define access permission levels (or, "controls") that cause the network enclave system 102 to operate in a disconnected state and/or a limited connectivity state. For example, the access permission controls may prevent the raw enclave data from being exposed to any external systems.

In some embodiments, the network enclave systems 102 may function to generate secure search queries. For example, users of the network enclave systems 102 may want to search external systems based on raw enclave data. However, the network enclave systems 102 may prevent raw enclave data from leaving the network enclave systems 102, so the raw enclave data cannot be used as search terms in an external search. Accordingly, the network enclave systems 102 may generate signature values (e.g., cryptographic hash values) from the raw enclave data, and then truncate the signature values to a signature "prefix" (e.g., the first four characters of the signature value). The signature prefix may implement k-anonymity by setting the prefix to a particular length that may ensure multiple matches to any query, thereby obscuring the full hash of the raw enclave data and thus preventing various forms of "rainbow table" attacks. In some embodiments, the signature prefixes are the only pieces of information that leave the network enclave systems 102, and signature prefixes may represent the entirety of a secure search query against a remote system.

In some embodiments, when querying a signature prefix against remote systems and/or datasets, all of the query results with matching signature prefixes may be returned. These query results may contain a number of false positives (e.g., data that has a matching signature prefix but not a matching full hash), and anonymity is maintained until the entire result set is moved within a network enclave system 102 for disambiguation. For example, the network enclave systems 102 may use a corresponding function (e.g., corresponding cryptographic hash function) to reveal the underlying data of the query results, and then compare that underlying data with the raw enclave data to determine potential matches. The network enclave systems 102 may notify users of potential matches.

The central systems 104 may function to store raw central data. In various embodiments, functionality of the central systems 104 may be performed by one or more servers (e.g., a cloud-based server) and/or other computing devices. Like the other systems described herein, the central systems 104 may be implemented by cloud-computing platforms. The central systems 104 may be large-scale and/or centralized systems on corporate networks that host enterprise level reference data. The central systems 104 and the network enclave systems 102 may or may not be owned and/or operated by the same entity.

The central systems 104 may function to process secure search queries. The central systems 104 may generate signatures (e.g., cryptographic hashes) of the raw central data using the same function used by the network enclave systems 102 to generate their signatures. However, unlike the network enclave systems 102, the central system 104 may not truncate the signatures of the raw central data. The central systems 104 may then compare the signature prefixes included in the secure search query against one or more datastores of the central systems 104, where it may find all instances of matching signature prefixes between the secure search query and the signatures generated from the raw central data. The central systems 104 may then returns a list of full hash values as search results for the secure search query. In some embodiments, because the signature values from the network enclave systems 102 have been truncated to prevent the data itself from being revealed through the search results, the results themselves may contain false positives, making it impossible, and/or unlikely, for the central system 104 to determine what values the network enclave systems 102 was searching for, or whether there were any true hits.

The communications network 106 may represent one or more computer networks (e.g., LAN, WAN, or the like) or other transmission mediums. The communication network 110 may provide communication between network enclave systems 102, central system 104, and/or other systems, engines, and/or datastores described herein. In some embodiments, at least a portion of the network enclave systems 102 may be disconnected from the communication network 106 and/or other systems. In some embodiments, the communication network 106 includes one or more computing devices, routers, cables, buses, and/or other network topologies (e.g., mesh, and the like). In some embodiments, the communication network 106 may be wired and/or wireless. In various embodiments, the communication network 106 may include the Internet, one or more wide area networks (WANs) or local area networks (LANs), one or more networks that may be public, private, IP-based, non-IP based, and so forth.

Figure 2:
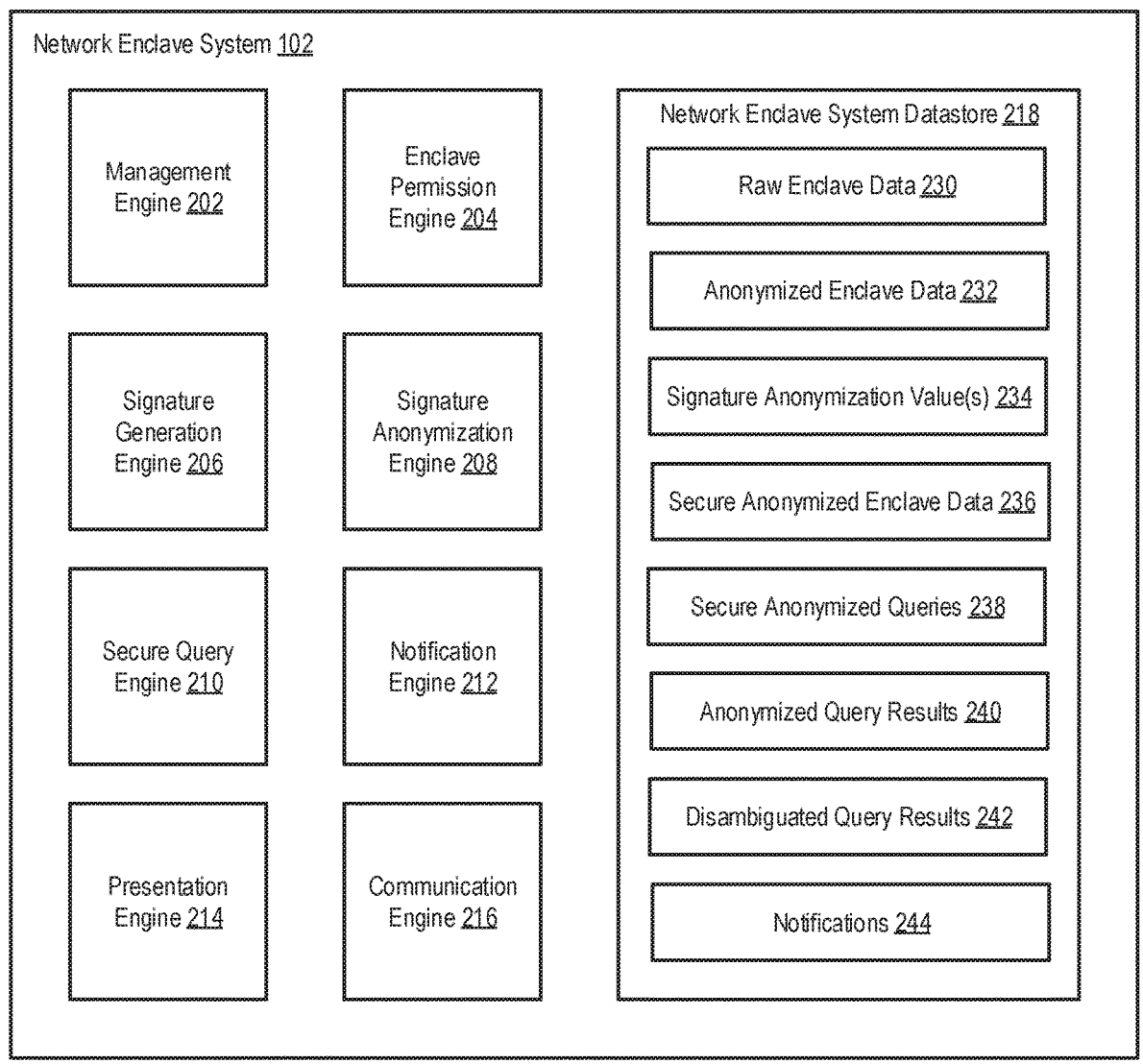
FIG. 2 depicts a diagram of an example of a network enclave system according to some embodiments.

FIG. 2 depicts a diagram 200 of an example of a network enclave system 102 according to some embodiments. In the example of FIG. 2, the network enclave system 102 includes a management engine 202, an enclave permission engine 204, a signature generation engine 206, a signature anonymization engine 208, a secure query engine 210, a notification engine 212, a presentation engine 214, a communication engine 216, and a network enclave system datastore 218.

The management engine 202 may function to manage (e.g., create, read, update, delete, or otherwise access) raw enclave data 230, anonymized enclave data 232, signature anonymization value(s) 234, secure anonymized enclave data 236, secure anonymized queries 238, anonymized query results 240, disambiguated query results 242, and/or notifications 244. Any of 230-244 may be stored in the network enclave system datastore 218 and/or other datastore(s) associated with the network enclave system 102. The management engine 202 may perform any of these operations manually (e.g., by a user interacting with a GUI) and/or automatically (e.g., triggered by one or more of the engines 204-216). Like other engines described herein, some or all of the functionality of the management engine 202 may be included in and/or cooperate with one or more other engines (e.g., engines 204-216).

The enclave permission engine 204 may function to generate access permission levels and/or enforce access permission levels. In some embodiments, the enclave permission engine 204 may control access to one or more data regions of the network enclave system 102 that store raw enclave data 230. For example, the enclave permission engine 204 may confine the raw enclave data 230 to the network enclave system 102, and/or particular regions thereof (e.g., via one or more firewalls and/or other security measures). Accordingly, the enclave permission engine 204 may prevent the raw enclave data 230 from leaving the network enclave system 102.

In some embodiments, the enclave permission engine 204 may also allow other types of data to leave the network enclave system 102. For example, the enclave permission engine 204 may define access permission levels that allow secure data (e.g., secure anonymized enclave data 236, secure anonymized queries 238, discussed below) to leave the network enclave system 102. Accordingly, the enclave permission engine 204 may control various connections of the network enclave system 102. For example, the enclave permission engine 204 may disconnect portions of the network enclave system 102 from external communication networks (e.g., communications network 106), in addition to, or instead of, controlling the type of data that can be transmitted along those networks.

The signature generation engine 206 may function to generate anonymized enclave data 232 from the raw enclave data 230. The raw enclave data 230 may include tabular data, object-oriented data, and/or the like. For example, the raw enclave data 230 may include records of one or more individuals. The records may include sensitive information that should not be revealed outside of the network enclave system 102. For example, the sensitive information may include patient information, such as patient names (e.g., "John Doe"), patient phone numbers, patient addresses, and/or the like. The anonymized enclave data 232 may include signature values, such as cryptographic hash values generated from the raw enclave data 230 using one or more cryptographic hash function.

The signature anonymization engine 208 may function to determine signature anonymization values 234. In some embodiments, a signature anonymization value 234 indicates a number of characters and/or placement of those characters within a string and/or other set of characters. For example, the signature anonymization value 234 may indicate four characters and/or a location of those four characters within a string (e.g., the first four characters, middle four characters, last four characters, and/or the like). In some embodiments, the signature anonymization engine 208 does not determine signature anonymization values 234 based on the raw enclave data 230 itself and/or other information associated with the network enclave system 102. This may, for example, prevent sensitive information from being inferred based on a signature anonymization value 234. Additionally, in some embodiments, signature anonymization values 234 may have a predetermined and/or consistent length which may also prevent sensitive information from being inferred based on the length of a signature anonymization value 234.

In some embodiments, the signature anonymization engine 208 may generate secure anonymized enclave data 236 from the anonymized enclave data 232. More specifically, the signature anonymization engine 208 may truncate the anonymized enclave data 232 based on a signature anonymization value 234. For example, the signature anonymization engine 208 may remove all of the characters from a signature value except for the first four characters (e.g., as indicated by the signature anonymization value 234). A truncated signature value may be referred to as a signature prefix, as well as secure anonymized enclave data 234.

In some embodiments, truncating a signature value based on a signature anonymization value 234 may implement k-anonymity for associated secure search queries. For example, the signature anonymization engine 208 may set the signature anonymization value 234 to a value (e.g., a length and/or placement) that ensures a predetermined number of matches (e.g., multiple matches) to any secure search query, thereby obscuring the full hash of the raw enclave data 230. This may, for example, prevent various types of attacks (e.g., "rainbow table attacks").

In some embodiments, the signature anonymization engine 208 may set a signature anonymization value 234 to a value that ensures a predetermined number of matches (e.g., achieving k-anonymity) to any secure search query if a dataset to be securely searched includes at least a threshold number of entries. For example, the dataset to be searched may need to include at least one hundred entries for the signature anonymization value to ensure a predetermined number of matches. Accordingly, in some embodiments, the signature anonymization engine 208 may function to determine and/or estimate a size of remote datasets. For example, the signature anonymization engine 208 may query a remote system (e.g., a central system 104) to determine a number of entries stored in their database.

In some embodiments, the signature anonymization engine 208 sets a signature anonymization value 234 based on a number of entries (or estimated number of entries) in a dataset to be securely searched. For example, the signature anonymization engine 208 may set a signature anonymization value 234 to a relatively short length (e.g., indicating the first three characters of a hash value) if the dataset to be searched is relatively small, but set a signature anonymization value 234 to a relatively long length (e.g., indicating the first six characters of a hash value) if the dataset to be searched is relatively large.

In some embodiments, the signature anonymization engine 208 may dynamically scale the length of a signature anonymization value 234 based on the size of the dataset to be searched, and/or the signature anonymization engine 208 may set the signature anonymization value 234 based on one or more thresholds. For example, the signature anonymization value may be set to three characters based on a first threshold (e.g., at least 1000 entries), set to four characters based on a second threshold (e.g., at least 5000 records), and so forth.

The secure query engine 210 may function to generate secure anonymized queries 238 (or, simply, secure search queries). The secure anonymized queries 238 may not include the original search terms (e.g., "John Doe"), but rather include secure anonymized enclave data 236. For example, a secure anonymized query 238 may include a flat file including signature prefixes without any additional information. The secure search queries may be provided to one or more remote systems (e.g., central systems 104) for processing.

In some embodiments, the secure query engine 210 may function to receive responses to secure search queries 238 that include anonymized query results 240. The anonymized query results 240 may include additional signature values. For example, the additional signature values may include full hash values that include one or more elements (e.g., row and/or column values) that match the signature prefix in an associated secure search query 238.

In some embodiments, the secure query engine 210 may function to disambiguate anonymized query results 240. For example, the secure query engine 210 may reconstitute the original search terms from the secure search query 238, and then link the search results to the corresponding raw enclave data 230. The secure query engine 210 may determine the original values of the search results since the search results may have been anonymized and/or encoded with a function known to the secure query engine 210 (e.g., the same function used by the signature generation engine 206).

The notification engine 212 may function to generate one or more notifications 244. For example, the notifications 244 may indicate potential matches between search results 240 and the raw enclave data 230 associated with the original search term (e.g., John Doe) used in a secure search query 238. Users may then indicate potential matches as either relevant or not relevant.

The presentation engine 214 may function to present and/or display one or more dashboards and/or other types of graphical user interfaces. For example, a dashboard may allow a user (e.g., authorized network enclave system user) to input raw enclave data 230 to the network enclave system 102, generate and/or submit secure anonymized queries 238, view search results (e.g., anonymized query results 240), disambiguate search results (e.g., anonymized query results 240), view notifications 244, and/or otherwise interact with the network enclave system 102.

The communication engine 216 may function to send requests, transmit and, receive communications, and/or otherwise provide communication with one or a plurality of the systems, engines, and/or datastores described herein. In some embodiments, the communication engine 216 functions to encrypt and decrypt communications. The communication engine 216 may function to send requests to and receive data from one or more systems through a network or a portion of a network. Depending upon implementation-specific considerations, the communication engine 216 may send requests and receive data through a connection, all or a portion of which may be a wireless connection. The communication engine 216 may request and receive messages, and/or other communications from associated systems and/or engines. Communications may be stored in the network enclave system datastore 218.

Figure 3:
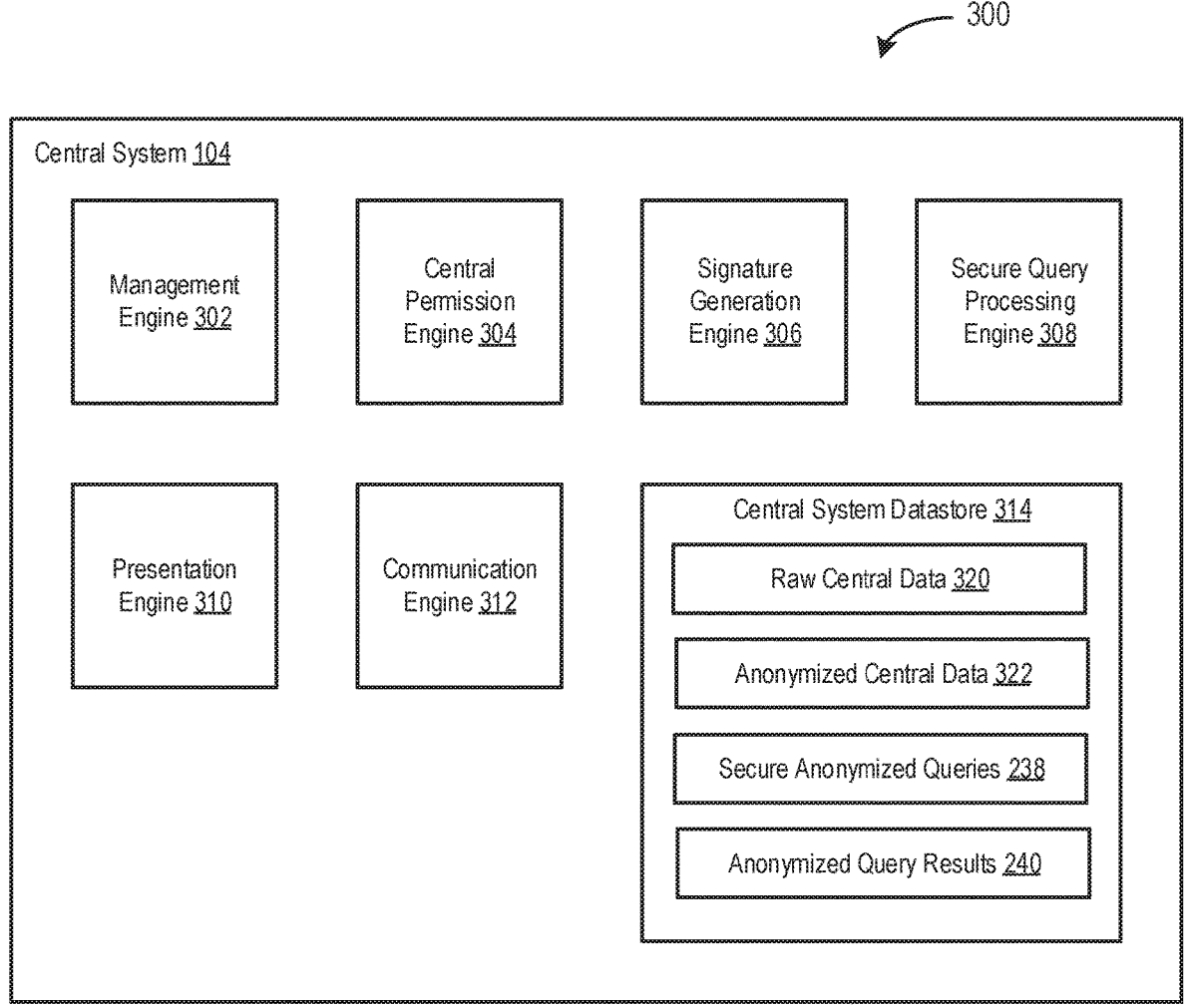
FIG. 3 depicts a diagram of an example of a central system according to some embodiments.

FIG. 3 depicts a diagram 300 of an example of a central system 104 according to some embodiments. In the example of FIG. 3, the central system 104 includes a management engine 302, a central permission engine 304, a signature generation engine 306, a secure query processing engine 308, a presentation engine 310, a communication engine 312, and a central system datastore 314.

The management engine 302 may function to manage (e.g., create, read, update, delete, or otherwise access) raw central data 320, anonymized central data 322, secure anonymized queries 238 (e.g., as received from a network enclave system 102), and/or anonymized query results 240. Any of foregoing data may be stored in the central system datastore 314 and/or other datastore(s) associated with central system 104. The management engine 302 may perform any of these operations manually (e.g., by a user interacting with a GUI) and/or automatically (e.g., triggered by one or more of the engines 304-312). Like other engines described herein, some or all of the functionality of the management engine 302 may be included in and/or cooperate with one or more other engines (e.g., engines 304-312).

The central permission engine 304 may function to generate access permission levels and/or enforce access permission levels. In some embodiments, the central permission engine 304 may control access to one or more data regions (e.g., "public" regions) of the central system 104 that stores raw central data 320. For example, the central permission engine 304 may confine some raw central data 320 to the central system 104 and/or particular regions thereof (e.g., via one or more firewalls and/or other security measures), while allowing other raw central data 320 to leave the central system 104. In some embodiments, the raw central data 320 may be considered non-sensitive data, or at least not as sensitive as the raw enclave data 230.

The signature generation engine 306 may function to generate anonymized central data 322 from raw central data 320. The raw central data 320 may include tabular data, object-oriented data, and/or the like. For example, the raw central data 320 may include police reports, and/or records of other public or private agencies. Accordingly, the raw central data 320 may include rows and columns of names (e.g., John Doe), phone numbers, addresses, and/or the like. The anonymized central data 322 may include signature values, such as cryptographic hash values generated from the raw central data 230 using a cryptographic hash function (e.g., the same hash function used to generate anonymized enclave data 232).

The secure query processing engine 308 may function to receive and/or process secure search queries 238. In some embodiments, the secure query processing engine 308 compares truncated signature values 236 included in a secure search query 238 to the anonymized central data 322. For example, the secure query processing engine 308 may compare the truncated signature values to corresponding values (e.g., the first four characters) of one or more row values and/or column values of the anonymized central data 322. Similarly, if the anonymized central data 322 is object-based, the secure query processing engine 308 may compare the truncated signature values to object properties of the anonymized central data 322.

In some embodiments, if there is a match (e.g., between a truncated signature value 238 and a particular column value of the anonymized central data 322), the secure query processing engine 308 may include the entire corresponding row and/or object of the anonymized central dataset 322 in the anonymized query results 240. Accordingly, the search results may comprise the full hash values of any entries from the anonymized central data 322 including a match to the truncated signature value of the secure search query 238. In some embodiments, the anonymized query results 240 may include data source metadata indicating a source of the query results. For example, the data source metadata may indicate a particular central system 104, and/or particular data regions, where the data originated.

The presentation engine 310 may function to present and/or display one or more dashboards and/or other types of graphical user interfaces. For example, a dashboard may allow a user (e.g., an authorized central system user) to input and/or collect raw central data 320 (e.g., from one or more other systems), trigger anonymization of raw central data, and/or otherwise interact with the central system 104.

The communication engine 312 may function to send requests, transmit and, receive communications, and/or otherwise provide communication with one or a plurality of the systems, engines, and/or datastores described herein. In some embodiments, the communication engine 312 functions to encrypt and decrypt communications. The communication engine 312 may function to send requests to and receive data from one or more systems through a network or a portion of a network. Depending upon implementation-specific considerations, the communication engine 312 may send requests and receive data through a connection, all or a portion of which may be a wireless connection. The communication engine 312 may request and receive messages, and/or other communications from associated systems and/or engines. Communications may be stored in the central system datastore 314.

Figure 4:
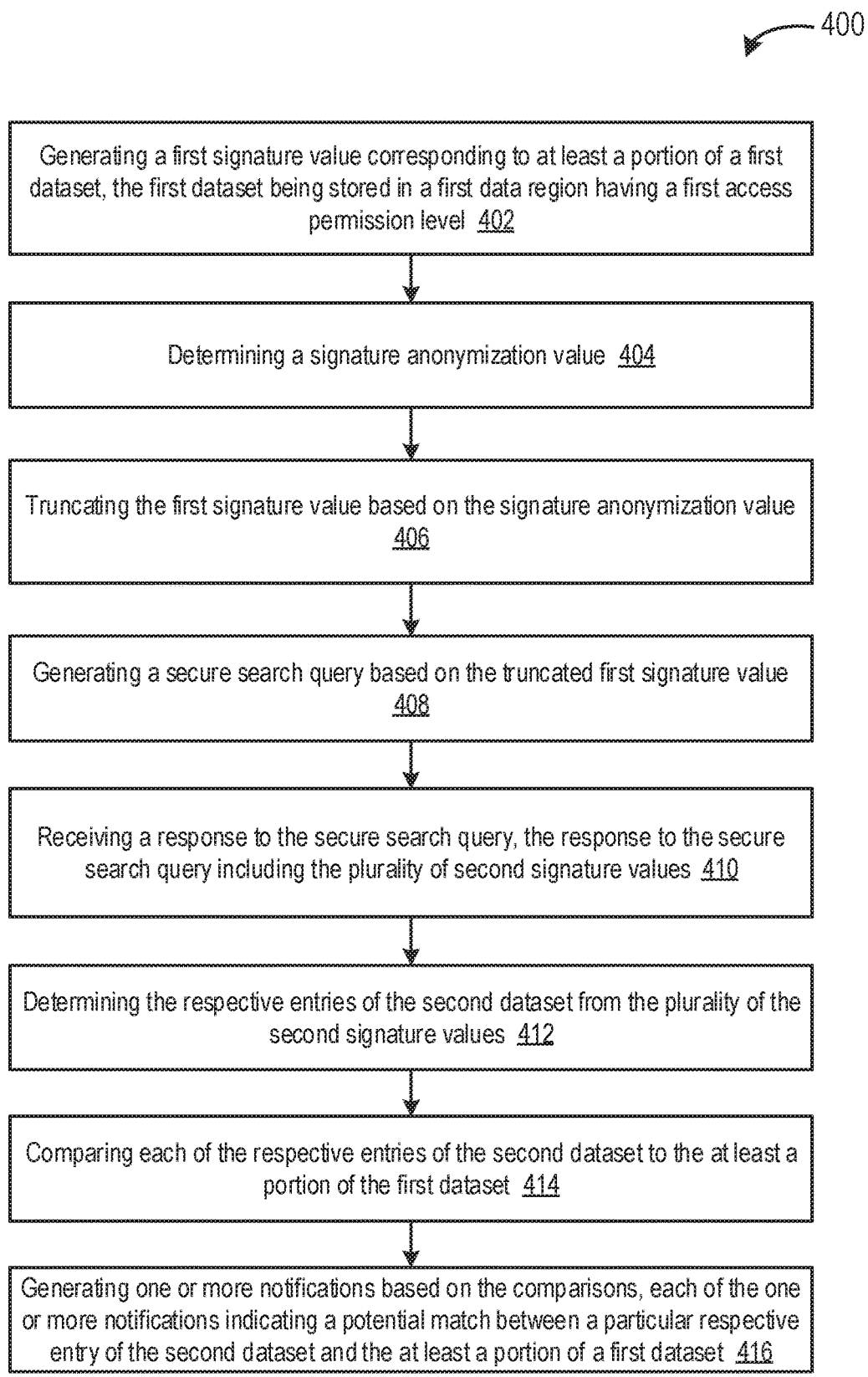
FIG. 4 depicts a flowchart of an example of a method of operation of a network enclave system according to some embodiments.

FIG. 4 depicts a flowchart 400 of an example of a method of operation of a network enclave system according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed but may have been included for the sake of illustrative clarity.

In step 402, a network enclave system (e.g., network enclave system 102) generates a first signature value (e.g., anonymized enclave data 232) corresponding to at least a portion of a first dataset (e.g., raw enclave data 230). For example, the first signature value may be a cryptographic hash value generated from the at least a portion of the first data set using a cryptographic hash function. The first dataset may be stored in a first data region (e.g., a secure region of the network enclave system datastore 218) having a first access permission level. For example, the first access permission level may confine and/or restrict the raw enclave data to the network enclave system and/or portion(s) thereof (e.g., the first data region). In some embodiments, a signature generation engine (e.g., signature generation engine 206) generates the first signature value, and an enclave permission engine (e.g., enclave permission engine 204) generates and/or controls the first access permission level.

In step 404, the network enclave system determines a signature anonymization value (e.g., signature anonymization value 234). In some embodiments, the signature anonymization value indicates a number of characters and/or placement of those characters within a string and/or other set of characters. For example, the signature anonymization value may indicate four characters and/or a location of those four characters within a string (e.g., the first four characters, middle four characters, last four characters, and/or the like). In some embodiments, a signature anonymization engine (e.g., signature anonymization engine 208) determines the signature anonymization value.

In step 406, the network enclave system truncates the first signature value based on the signature anonymization value. For example, the network enclave system may remove all of the characters from the first signature value except for the first four characters (e.g., as indicated by the signature anonymization value). A truncated signature value may be referred to as a signature prefix and/or secure anonymized enclave data (e.g., secure anonymized enclave data 236). In some embodiments, truncating the first signature value based on the signature anonymization value implements k-anonymity for an associated secure search query. For example, the signature anonymization value may be set to a value (e.g., a length) that ensures a predetermined number of matches (e.g., multiple matches) to any secure search query, thereby obscuring the full hash of the raw enclave data. This may, for example, prevent various types of attacks (e.g., rainbow table attacks). In some embodiments, the signature anonymization engine truncates the first signature value.

In step 408, the network enclave system generates a secure search query (e.g., secure anonymized query 238) for identifying, based on the truncated first signature value, a plurality of second signature values (e.g., anonymized central data 322). For example, the secure search query may include the first four characters of a hash value generated from a search term (e.g., "John Doe"). The secure search query may comprise a flat file and/or other structure for storing the truncated first signature value. The secure search query may include any number of such truncated signature values corresponding to any number of search terms.

In some embodiments, each of the plurality of second signature values may correspond to a respective entry of a second dataset (e.g., raw central data 320). For example, the second signature values may be generated from the second dataset in the same manner as the first signature values (e.g., using the same cryptographic hash function). The second dataset may be stored in one or more second data regions (e.g., central system datastore 314) having one or more second access permission levels. The second access permission levels may be a "public" permission level that is less restrictive than the first access permission level. For example, the second access permission level may allow raw central data to be collected from remote systems, leave the central system, and/or the like. In some embodiments, a central permission engine (e.g., central permission engine 304) generates and/or controls the second access permission levels, and the secure query engine (e.g., secure query engine 210) generates the secure search query.

In some embodiments, the first signature anonymization value is set to a value that ensures a predetermined number of matches (e.g., achieving k-anonymity) for any secure search query if the second dataset includes at least a threshold number of entries. For example, the second dataset may need to include at least one hundred entries for the signature anonymization value to ensure a predetermined number of matches.

In some embodiments, the first signature anonymization value is based on the number of entries (or estimated number of entries) in the second dataset. For example, the first signature anonymization value may have a relatively short length (e.g., indicating the first three characters) if the second dataset is relatively small, and the first signature anonymization value may have relatively long length (e.g., indicating the first six characters) if the second data is relatively large. In some embodiments, the length of the signature anonymization value may dynamically scale with the size of the second dataset, and/or may be based on thresholds. For example, the signature anonymization value may be set to three characters based on a first threshold (e.g., at least 1000 entries), set to four characters based on a second threshold (e.g., at least 5000 records), and so forth.

In step 410, the network enclave system receives a response to the secure search query (e.g., anonymized query results 240). The response to the secure search query may include the plurality of second signature values. In some embodiments, the secure query engine receives the response to the secure search query.

In step 412, the network enclave system determines the respective entries of the second dataset from the plurality of the second signature values. For example, the network enclave system may use the same function used to generate the first and second signature values to determine the respective entries of the second data set. For example, the respective entries of the second dataset may be determined to include a record (e.g., a police report record) including the search term (e.g., "John Doe").

In step 414, the network enclave system compares each of the respective entries of the second dataset to the at least a portion of the first dataset. In some embodiments, the secure query engine performs the comparison.

In step 416, the network enclave system generates one or more notifications (e.g., notifications 244) based on the comparisons. Each of the one or more notifications may indicate a potential match between a particular respective entry of the second dataset and the at least a portion of a first dataset. The potential matches may be referred to as disambiguated query results (e.g., disambiguated query results 242).

Figure 5:
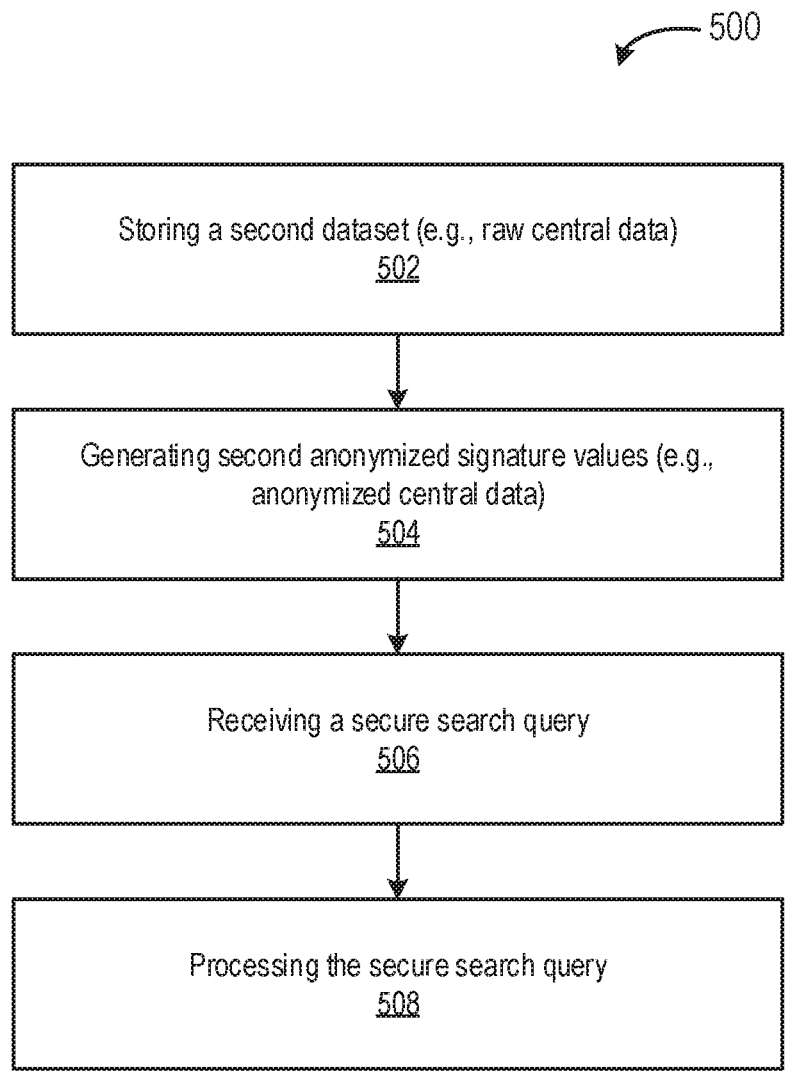
FIG. 5 depicts a flowchart of an example of a method of operation a central system according to some embodiments.

FIG. 5 depicts a flowchart 500 of an example of a method of operation a central system according to some embodiments.

In step 502, a central system (e.g., central system 104) stores a second dataset (e.g., raw central data 320). In some embodiments, a central system datastore (e.g., central system datastore 314) stores the second dataset.

In step 504, the central system generates second anonymized signature values (e.g., anonymized central data 322). The second anonymized signature values may be generated periodically and/or dynamically (e.g., in response to receiving a secure search query). In some embodiments, a signature generation engine (e.g., signature generation engine 306) generates the second anonymized signature values.

In step 506, the central system receives a secure search query (e.g., secure anonymized query 238). In some embodiments, a secure query processing engine (e.g., secure query processing engine 308) receives the secure search query.

In step 508, the central system processes the secure search query. In some embodiments, the central system compares a truncated first signature value included the secure search query to second signature values corresponding to the entries of the second dataset. For example, the central system may compare the truncated first signature value to corresponding hash values (e.g., the first four characters) of one or more row values and/or column values of the second dataset. Similarly, if the second data set of object-based, the central system may compare the truncated first signature value to the corresponding hashed object properties. For example, if there is a match with a particular column value, the result may include the entire corresponding row. Accordingly, the query results may comprise the full hash values of any entries including a match to the truncated first signature value. In some embodiments, the secure query processing engine process the secure search query.

Figure 6:
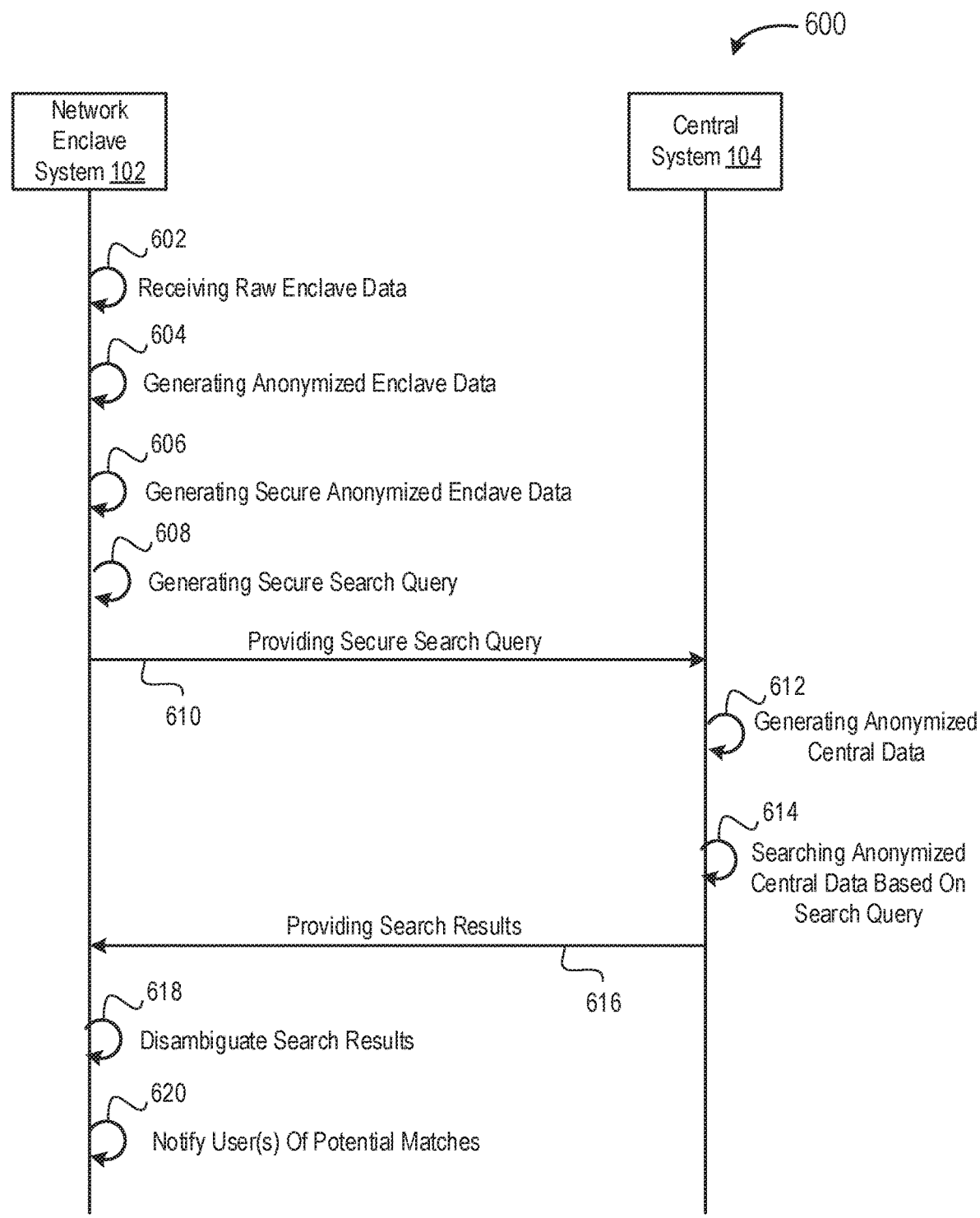
FIG. 6 depicts a flowchart of an example of a method of generating and processing secure search queries according to some embodiments.

FIG. 6 depicts a flowchart 600 of an example of a method of generating and processing secure search queries according to some embodiments.

In step 602, a network enclave system (e.g., network enclave system 102) receives raw enclave data (e.g., raw enclave data 230). For example, a user may input the raw enclave data via a graphical user interface presented by a presentation engine (e.g., presentation engine 310).

In step 604, the network enclave system generates anonymized enclave data (e.g. anonymized enclave data 232). For example, the anonymized enclave data may be generated periodically and/or dynamically (e.g., in response to receive search terms for performing a secure search query). In some embodiments, a signature generation engine (e.g., signature generation engine 206) generates the anonymized enclave data.

In step 606, the network enclave system generates secure anonymized enclave data (e.g., secure anonymized enclave data 236) based on a signature anonymization value (e.g., signature anonymization value 234). For example, the secure anonymized enclave data may be generated periodically and/or dynamically (e.g., in response to receiving search terms for performing a secure search query). In some embodiments, a signature anonymization engine (e.g., signature anonymization engine 208) generates the secure anonymized enclave data.

In step 608, the network enclave system generates a secure search query (e.g., secure anonymized query 238) based on the secure anonymized enclave data. In some embodiments, a secure query engine (e.g., secure query engine 210) generates the secure search query.

In step 610, the network enclave system provides the secure search query to a remote system (e.g., central system 104). For example, the network enclave system may have access permission rules (e.g., generated and/or controlled by enclave permission engine 204) that prevent raw enclave data from leaving the network enclave system, but allow the secure search query to be provided the remote system. A communication engine (e.g., communication engine 216) may provide the secure search query to the remote system over a communications network (e.g., communications network 106).

In step 612, the central system generates anonymized central data (e.g., anonymized central data 322) from raw central data (e.g., raw central data 320). In some embodiments, a signature generation engine (e.g., signature generation engine 306) generates the anonymized central data.

In step 614, the central system searches the anonymized central data based on one or more truncated signature values (e.g., secure anonymized enclave data 236) included in the secure search query. In some embodiments, a secure query processing engine (e.g., secure query processing engine 308) performs the search.

In step 616, the central system provides the search results (e.g., anonymized query results 240) to the network enclave system. In some embodiments, a communication engine (e.g., communication engine 312) provides the search results to the network enclave system over the communications network.

In step 618, the network enclave system disambiguates the search results against the search term(s) (e.g., "John Doe") used to generate the secure search query. The search results may be linked to the corresponding raw enclave data.

In some embodiments, the network enclave system reconstitutes the truncated signature values with their original, untruncated hashes and/or their original raw enclave data. In some embodiments, the secure query engine disambiguates the search results.

In step 620, the network enclave system notifies one or more users of potential matches. For example, a presentation engine (e.g., presentation engine 214) may present one or more notifications (e.g., notifications 244).

Hardware Implementation

Figure 7:
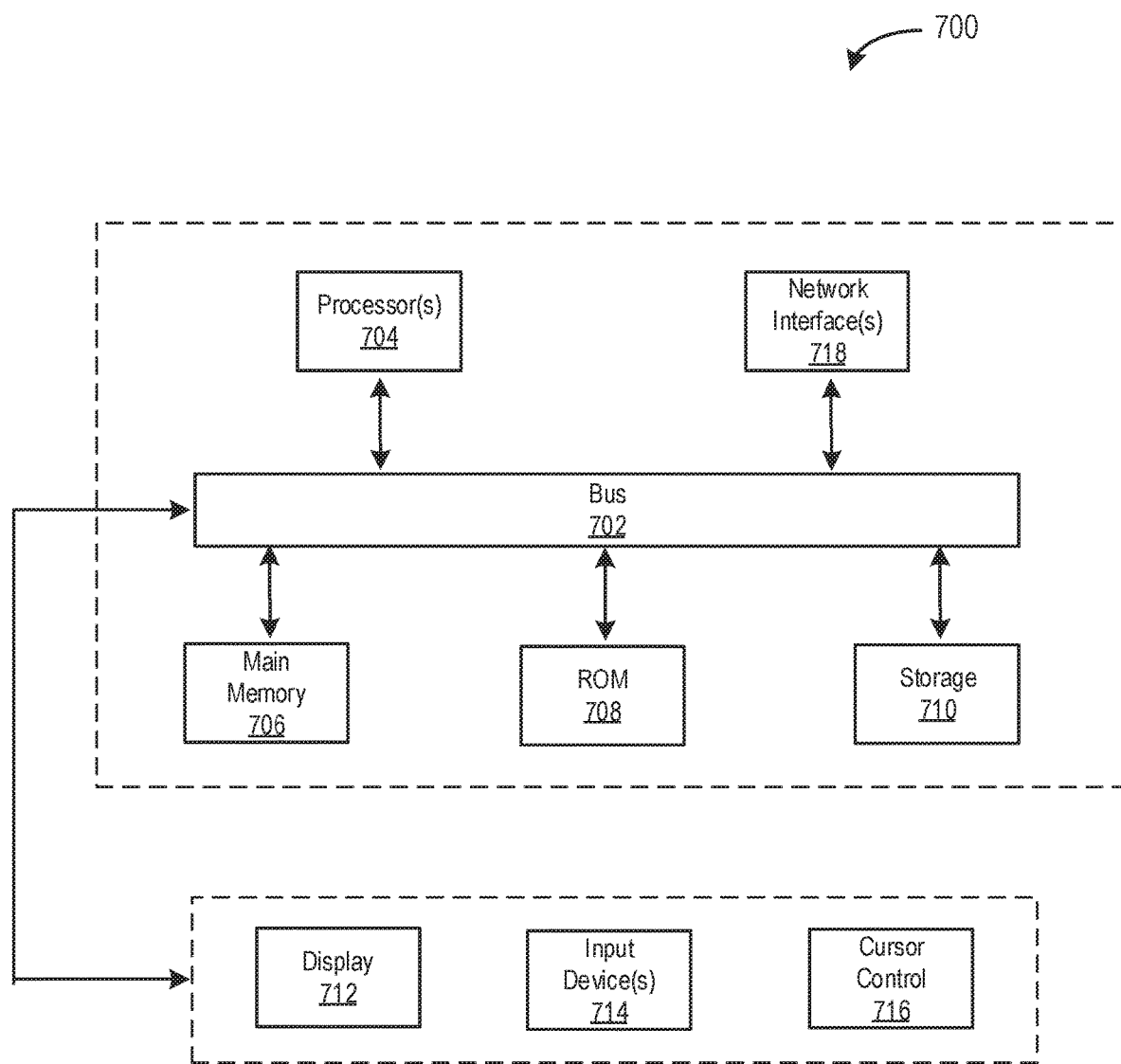
FIG. 7 depicts a diagram of an example computer system for implementing the features disclosed herein.

FIG. 7 depicts a block diagram of an example of a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
one or more processors; and
a memory storing instructions that, when executed by the one or more processors, cause the system to perform:
generating a first signature value corresponding to a search term based on a cryptographic hash function, wherein the first signature value is a cryptographic hash value and the search term corresponds to a portion of a first dataset stored in a first data region having a first access permission level;
truncating the first signature value based on a signature anonymization value, wherein the signature anonymization value indicates a number of character placements at which to truncate the first signature value and corresponds to at least a predetermined number of matches if a second dataset includes at least a threshold number of entries;

generating, based on the truncated first signature value, a secure search query for the search term with which to search the second dataset stored in a second data region having a second access permission level;

receiving a response to the secure search query, wherein the response includes a plurality of second signature values based on the cryptographic hash function and each of the plurality of second signature values corresponding to an entry of the second dataset that is associated with the search term;

disambiguating the plurality of the second signature values based on the cryptographic technique to reveal entries of the second dataset that are associated with the search term; and generating a notification in response to each of the entries of the second dataset matching the portion of the first dataset.

2. The system of claim 1, wherein each of the plurality of second signature values comprises a hash value.

3. The system of claim 1, wherein the first data region comprises an enclave data region and the second data region comprises a public data region.

4. The system of claim 1, wherein the response further includes data source metadata associated with the second data region.

5. The system of claim 1, wherein the first data region is associated with a network enclave system and the first access permission level prohibits the search term to be based on the portion of the first dataset.

6. The system of claim 5, wherein the second data region is associated with a central system and the second permission level permits the search query to be performed on the second dataset.

7. The system of claim 1, wherein the signature anonymization value is generated based on a number of entries of the second dataset.

8. The system of claim 7, wherein the signature anonymization value is dynamically scaled based on the number of entries in the second dataset.

9. The system of claim 1, wherein the first data region is distinct from the second data region.

10. A method being implemented by a computing system including one or more processors and a storage media storing machine-readable instructions, the method comprising:

generating a first signature value corresponding to a search term based on a cryptographic hash function, wherein the first signature value is a cryptographic hash value and the search term corresponds to a portion of a first dataset stored in a first data region having a first access permission level;

truncating the first signature value based on a signature anonymization value, wherein the signature anonymization value indicates a number of character placements at which to truncate the first signature value and corresponds to at least a predetermined number of matches if a second dataset includes at least a threshold number of entries;

generating, based on the truncated first signature value, a secure search query for the search term with which to search the second dataset stored in a second data region having a second access permission level;

receiving a response to the secure search query, wherein the response includes a plurality of second signature values based on the cryptographic hash function and each of the plurality of second signature values corresponding to an entry of the second dataset that is associated with the search term;

disambiguating the plurality of the second signature values based on the cryptographic technique to reveal entries of the second dataset that are associated with the search term; and generating a notification in response to each of the entries of the second dataset matching the portion of the first dataset.

11. The method of claim 10, wherein each of the plurality of second signature values comprises a hash value.

12. The method of claim 10, wherein the first data region comprises an enclave data region and the second data region comprises a public data region.

13. The method of claim 10, wherein the response further includes data source metadata associated with the second data region.

14. The method of claim 10, wherein the first data region is associated with a network enclave system and the first access permission level prohibits the search term to be based on the portion of the first dataset.

15. The method of claim 14, wherein the second data region is associated with a central system and the second permission level permits the search query to be performed on the second dataset.

16. The method of claim 10, wherein the signature anonymization value is generated based on a number of entries of the second dataset.

17. The method of claim 10, wherein the first data region is distinct from the second data region.

18. A non-transitory computer readable medium of a computing system storing instructions that, when executed by one or more processors, cause the computing system to perform:

generating a first signature value corresponding to a search term based on a cryptographic hash function, wherein the first signature value is a cryptographic hash value and the search term corresponds to a portion of a first dataset stored in a first data region having a first access permission level;

truncating the first signature value based on a signature anonymization value, wherein the signature anonymization value indicates a number of character placements at which to truncate the first signature value and corresponds to at least a predetermined number of matches if a second dataset includes at least a threshold number of entries;

generating, based on the truncated first signature value, a secure search query for the search term with which to search the second dataset stored in a second data region having a second access permission level;

receiving a response to the secure search query, wherein the response includes a plurality of second signature values based on the cryptographic hash function and each of the plurality of second signature values corresponding to an entry of the second dataset that is associated with the search term;

disambiguating the plurality of the second signature values based on the cryptographic technique to reveal entries of the second dataset that are associated with the search term; and generating a notification in response to each of the entries of the second dataset matching the portion of the first dataset.

19. The non-transitory memory of claim 18, wherein each of the plurality of second signature values comprises a hash value.

20. The non-transitory memory of claim 18, wherein the first data region comprises an enclave data region and the second data region comprises a public data region.

* * * * *